(No Model.) 6 Sheets—Sheet 1.

E. NORTON.
CAN FORMING AND SOLDERING MACHINE.

No. 395,795. Patented Jan. 8, 1889.

Fig. 1.

Witnesses:
Geo. E. Curtis
H. M. Munday

Inventor:
Edwin Norton
By Munday, Evarts & Adcock
his Attorneys.

(No Model.) 6 Sheets—Sheet 2.

E. NORTON.
CAN FORMING AND SOLDERING-MACHINE.

No. 395,795. Patented Jan. 8, 1889.

Fig. 2.

Witnesses:
Lew. E. Curtis
H. M. Munday

Inventor:
Edwin Norton.
By Munday, Evarts & Adcock
His Attorneys.

(No Model.)

E. NORTON.
CAN FORMING AND SOLDERING MACHINE.

No. 395,795.

Patented Jan. 8, 1889.

Witnesses:
Law. C. Burtis
H. W. Munday

Inventor:
Edwin Norton.
By Munday, Evarts & Adcock
his Attorneys.

(No Model.) 6 Sheets—Sheet 5.
E. NORTON.
CAN FORMING AND SOLDERING MACHINE.

No. 395,795. Patented Jan. 8, 1889.

(No Model.) 6 Sheets—Sheet 6.

E. NORTON.
CAN FORMING AND SOLDERING MACHINE.

No. 395,795. Patented Jan. 8, 1889.

Witnesses:
Lew. C. Curtis.
H. M. Munday.

Inventor:
Edwin Norton
By Munday, Evarts & Adcock
His Attorneys.

UNITED STATES PATENT OFFICE.

EDWIN NORTON, OF MAYWOOD, ASSIGNOR TO HIMSELF, AND OLIVER W. NORTON, OF CHICAGO, ILLINOIS.

CAN FORMING AND SOLDERING MACHINE.

SPECIFICATION forming part of Letters Patent No. 395,795, dated January 8, 1889.

Application filed September 11, 1888. Serial No. 285,107. (No model.)

*To all whom it may concern:*

Be it known that I, EDWIN NORTON, a citizen of the United States, residing in Maywood, in the county of Cook and State of Illinois, have invented a new and useful Improvement in Can-Body-Forming and Side-Seam-Soldering Machines, of which the following is a specification.

My invention relates to can-body-forming and side-seam-soldering machines.

In soldering the side seams of sheet-metal cans by automatic machines which operate to convey the can-body over or through a solder bath—such, for example, as the machine shown and described in my Letters Patent, No. 250,096, dated November 29, 1881—it is of great importance that the can-body be accurately so placed in the can-body carrier that the side seam of the can-body will be at the lowermost point, to the end that the seam be always fully immersed in or exposed to the solder, while at the same time as small a segment or arc as possible of the can-body be immersed in or smeared with the solder. Heretofore the can-bodies have usually been placed in such soldering-machines by hand, or else the cans have been turned or adjusted by hand to bring the side seam thereof down or at the lowermost point. This placing or adjusting the can-body in the side-seam-soldering machine by hand is thus not only attended with labor and expense, but defective work is liable to be occasioned by the attendant or operator inaccurately turning or adjusting the can-body, so that its side seam will not be properly immersed in or exposed to the soldering device as the same is carried along by the carrier of the soldering-machine.

The object of my invention is to overcome these difficulties and to produce a combined machine whereby the can-bodies may be both formed and the side seam thereof soldered, and which will operate automatically to positively deliver the can-body directly from the body-forming machine into the side-seam-soldering machine with the side seam of the can-body accurately turned down and in proper position for soldering.

My invention consists in the combination, with a can-body-forming machine of any well-known or suitable construction, having a horn around which the can-body is formed and a bumper or device for squeezing the side seam mounted below the horn, so that the can-body will be formed with its seam on the under side, of a side-seam-soldering machine having a bath or soldering device through or over which the can-body is conveyed by the carrier, the can-body being delivered directly into said carrier from said can-body-forming machine, so that the can-body will always have its side seam turned down in proper position for soldering as it is conveyed through the soldering-machine.

The invention further consists in the combination of a can-body-former horn and a device below the horn for closing the seam against the horn, with a feed device for the can-body blank adapted to deliver the blank above the horn, and forming devices for folding or forming the can-body blank around the horn, operating to fold the blank downward around the horn, so that the gravity of the sheet will operate in the direction the sheet moves during the folding operation and aid or assist the folding movement, instead of opposing the same. In the practical operation of can-body-forming machines wherein the sheet is folded or bent upward around the horn, as heretofore, the sheet being fed under the horn, it is found that considerable difficulty is experienced, especially in operating upon long sheets to form the larger-sized can-bodies, owing to the tendency of the sheets to recurve or bend backward at their ends by reason of their gravity when being folded or bent upward around the horn, and this difficulty is aggravated the more rapid the operation of the machine. By feeding the sheets in above the horn and then folding them downward around the horn the tendency of the sheets to lop and bend by their gravity is in the direction of the folding movement and assists the folding operation, instead of being an obstruction.

My invention also consists in the novel devices and novel combinations of parts and devices herein shown and described, and more particularly pointed out in the claims.

My invention may be applied to or used with any well-known or suitable construction of can-body-forming machine—as, for example, those shown in the United States patents heretofore granted to H. C. Milligan, W. J. Gordon, F. M. Leavitt, E. Jordan, and others. The particular type of body-forming machine, however, which I prefer to use in practicing my invention is that shown and described in Patent No. 250,266, granted to F. M. Leavitt, and dated November 29, 1881.

The general type of side-seam-soldering machines which I prefer to use in practicing my invention is that shown and described in my Letters Patent, No. 250,096, before referred to.

In the accompanying drawings, which form a part of this specification, and in which similar letters of reference indicate like parts.

In the drawings, A represents the frame of the machine; B, the horn around which the flat sheet out of which the can-body is formed is folded or bent.

C is the table upon which the flat sheet-metal blanks X are placed preparatory to being fed into the machine by the reciprocating feed-slide D.

E E and E' E' are the guides which support and guide the sheet as it is advanced by the feed-slide D first to the vertically and longitudinally reciprocating edge-folding devices F F' F² and then from said folders into position over the horn B. The guides E E' serve to support the sheet, and they or their supports have vertical flanges or parts $e$ $e$ for the edges of the sheet to abut against in order to keep the sheet true and square with the edge-folding devices F F' F² and with the horn B. The horn B is secured to the frame of the machine below the level of the feed-guides E E', so that the feed-slide D will deliver the sheet above and on top of the horn B.

Figure 8:
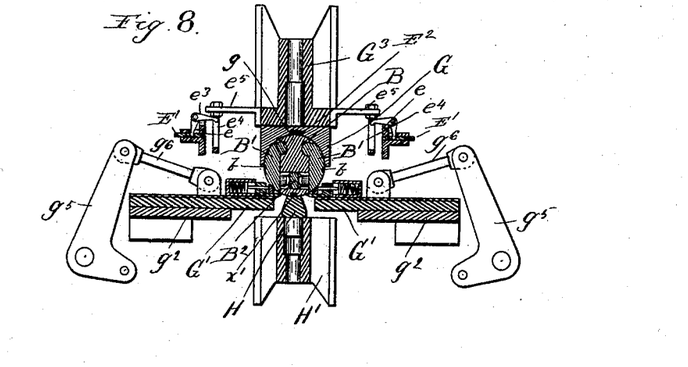
Fig. 8 is a partial cross-section on line 8 8 of Fig. 3.
Figure 9:
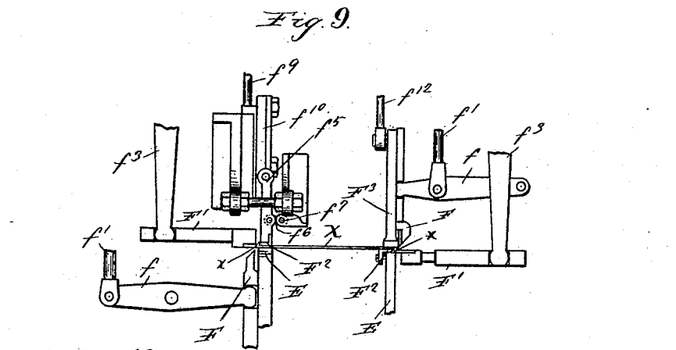
Fig. 9 is a detail view showing the edge-folding devices.
Figure 10:
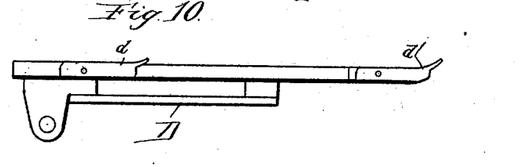
Fig. 10 is a detail view of the blank-feed slide.

The edges of the sheet X, which are interlocked upon the side seam of the can-body, are folded, one up and the other down, by the edge-folding devices F F' F² to form hooks $x$, as indicated in Fig. 9, and capable of being interlocked, as indicated in Fig. 8, when the sheet is wrapped around the horn.

When the blank X is fed or advanced over the horn B, its middle portion is supported by the horn B, while its edges are supported by the guides E' E'. These guides E' E' are made movable, so that they may be withdrawn out of the way to permit the sheet to be bent or folded downward around the horn B. To insure the retention of the sheet in a horizontal plane, so that the vertical guide-flanges $e$ on the supports for the guides E' will properly center the flat blank over the horn B, I provide a middle guide-bar, E², between which and the horn B the sheet X is fed. The front end of this guide is slightly turned up, as indicated at $e'$, so that the sheet may readily enter beneath the same. The space between the guide E² and the horn B should be equal to or very slightly exceed the thickness of the sheet X.

The sheet X is folded downward around the horn B by the vertically-reciprocating semicircular-shaped bending device G and the horizontally-reciprocating bending devices G' G', which also serve to interlock the hooked edges $x$ $x$ of the sheet, as indicated in Fig. 8. The folding device G is furnished with a longitudinal groove, $g$, to receive the central upper guide, E², as indicated in Fig. 8, so that said guide will not interfere with the proper bearing of the folder G against the surface of the sheet as it is folded around the horn. The under surface of the guide E² preferably conforms to the circle of the horn or the folder G, and it is preferably mounted on springs $g^8$ with guide-pins $g^9$, or so that it will hold the sheet under the pressure of the springs against the horn B, and thus prevent displacement of the sheet when the guides E' are withdrawn and while the folder G is bending the sheet around the horn.

The horn B is expansible, having hinged or movable segments B' B', adapted to be contracted or expanded by a central wedge, B², so that the size of the horn may be contracted while the hooks $x$ $x$ of the sheet are being interlocked or passed by each other by the horizontally-reciprocating folders G' G', and then again expanded to the full interior diameter of the can to properly interlock or pull the hooks $x$ $x$ against each other preparatory to the seam closing or squeezing operation.

H is the device for closing or squeezing the interlocked hooks $x$ $x$ firmly together. This seam-closing device operates in conjunction with the lower surface of the horn B, closing the interlocked folds of the side seam against said horn. This closing device preferably consists of a reciprocating plunger or bar, H, adapted to be moved up against the horn. It, however, may be made of any other suitable construction known to the art—as, for example, a revolving roller.

The horn B or its segments B' are furnished with longitudinal grooves $b$ for the spring fingers or pawls $k$ of the reciprocating can-body extractor or conveyer device K to fit in. The can-body, after being formed around the horn B, is extracted therefrom and delivered into the carrier device L of the soldering-machine by the reciprocating extractor or conveyer K.

The blank X is delivered centrally over the horn B and folded downward around it, so that when the hooks $x$ $x$ of the sheet are interlocked and the side seam, $x'$, formed such seam will be at the lowermost point of the can or diametrically underneath its axis.

The extractor device K operates to remove the can-body from the horn and deliver it into the carrier L of the soldering-machine without giving the can-body any axial rotation, so that the can-bodies will always have their side seams accurately and positively turned into proper position for soldering as they are conveyed over the soldering bath or device M and the aciding or fluxing device N by the carrier L. The can conveyer or extractor device K reciprocates on a suitable guideway, K', on the frame of the machine. The hook-shaped spring fingers or pawls $k$ operate to hook over the rear end of the can-body on the horn B and pull the can-body off the horn onto the track or guide $K^2$, which supports the can-body as it is advanced into the soldering device of the machine. The track $K^2$ is furnished with inclined projections $k'$, over which the can-body $x^2$ rides as the extractor-slide K advances, and which serves to prevent the spring-fingers $k$ $k$ from pushing the can-body backward on the return movement. The holding projections $k'$ are inclined or cam-shaped toward the horn and abrupt at their other end, as indicated clearly in Fig. 3, so that the can-bodies may ride over them in one direction but not in the other.

The conveyer K operates simultaneously upon two can-bodies, being provided with a second pair of pawls, fingers, or projections, $k^2$, which serve to advance or convey the can-body which has been delivered by the extractor-fingers $k$ from the horn B onto the guides $K^2$ into position to be caught and advanced by the carrier L of the soldering-machine. The fingers $k$ move the can-body from the horn B into position beyond the projections $k'$ on the track $K^2$ to be caught by the fingers or pawls $k^2$. The pawls or fingers $k^2$ are preferably normally pressed outward by springs. (Not shown.) If no springs, however, are employed, the can-body will yield or spring sufficiently, because it is removed from the horn when these fingers $k^2$ pass back of it.

The carrier device L of the soldering-machine preferably consists of a link chain mounted upon sprocket wheels or pulleys L', the openings in the links being large enough to receive the can-body within the same. As the links of this chain have preferably no devices for supporting the can-body, the can-body rides up on a guide-track, $L^2$, as it is advanced by the carrier. The carrier-chain L is guided or supported by a track or way, $L^3$, upon which it rides. The track $L^2$ is, in fact, but an extension of the track or guide $K^2$, along which the can-bodies are carried by the conveyer device K. The track $L^2$ is provided with suitable depressions, $L^4$, to permit the seam of the can-body to pass through or come in contact with the acid or flux in the bath N and the solder in the solder bath M. An upper guide, $L^5$, serves to guide the can as it passes through the solder bath and insure its proper immersion therein.

$L^6$ is a wiper device for wiping the surplus solder from the outside of the seam as the can-body passes under the hood or guide $L^7$.

$L^8$ $L^8$ are heating devices for heating the solder and the acid or flux baths. These heaters are preferably gas-jets.

Figure 1:
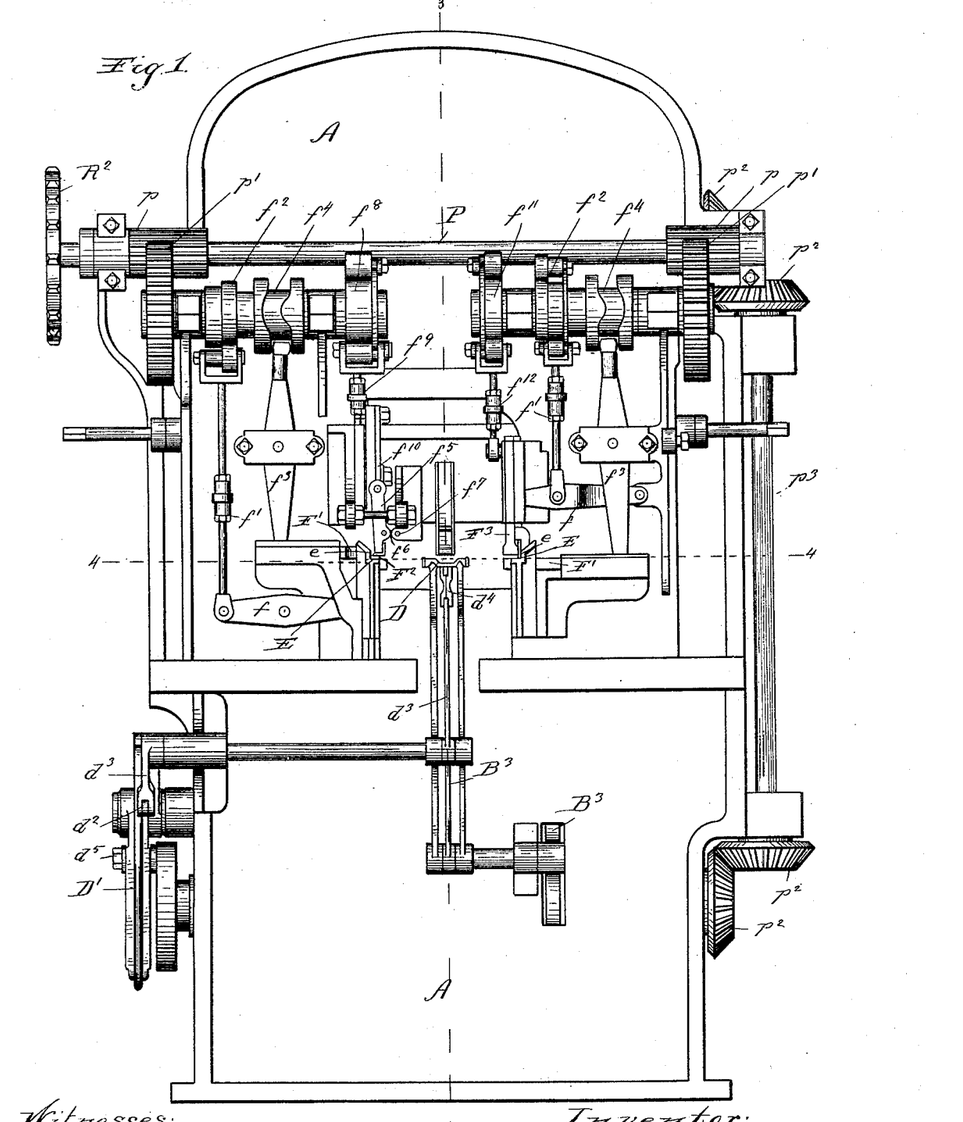
Figure 1 is a front elevation of a machine embodying my invention.
Figure 2:
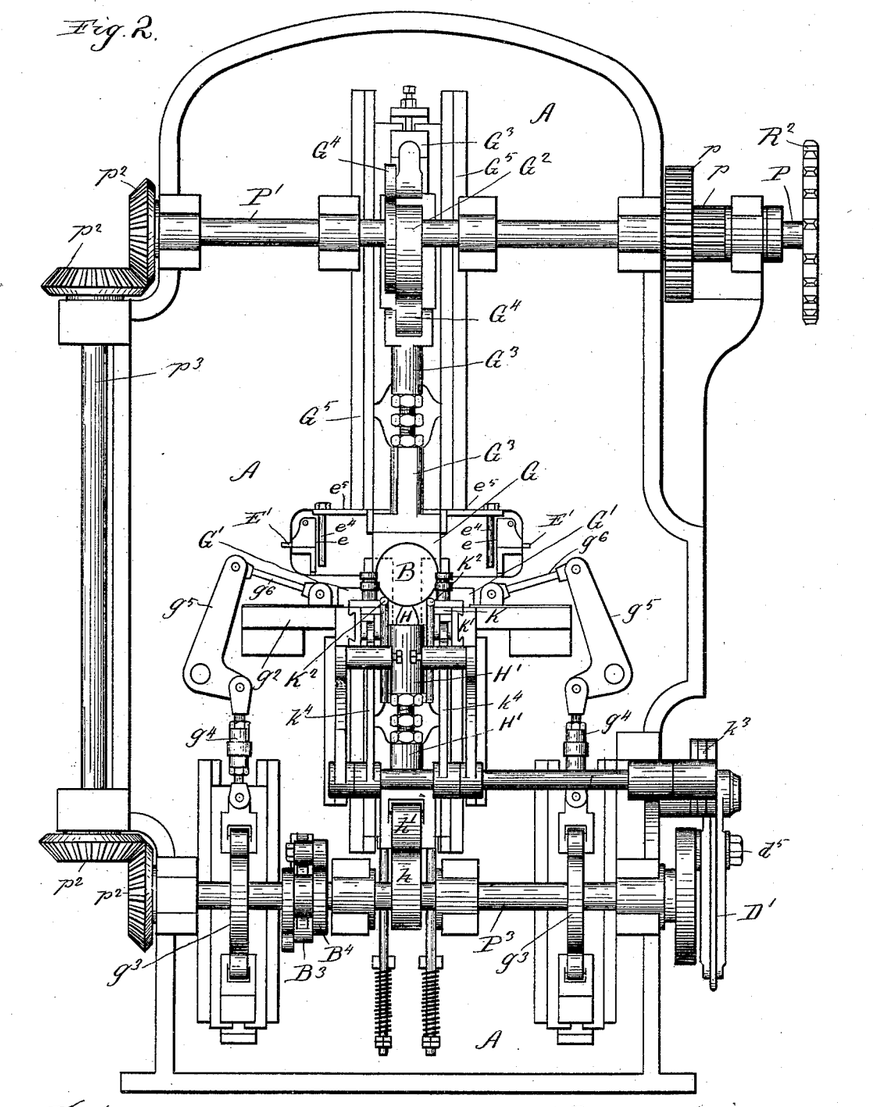
Fig. 2 is a rear elevation of the body-former portion of the machine.
Figure 3:
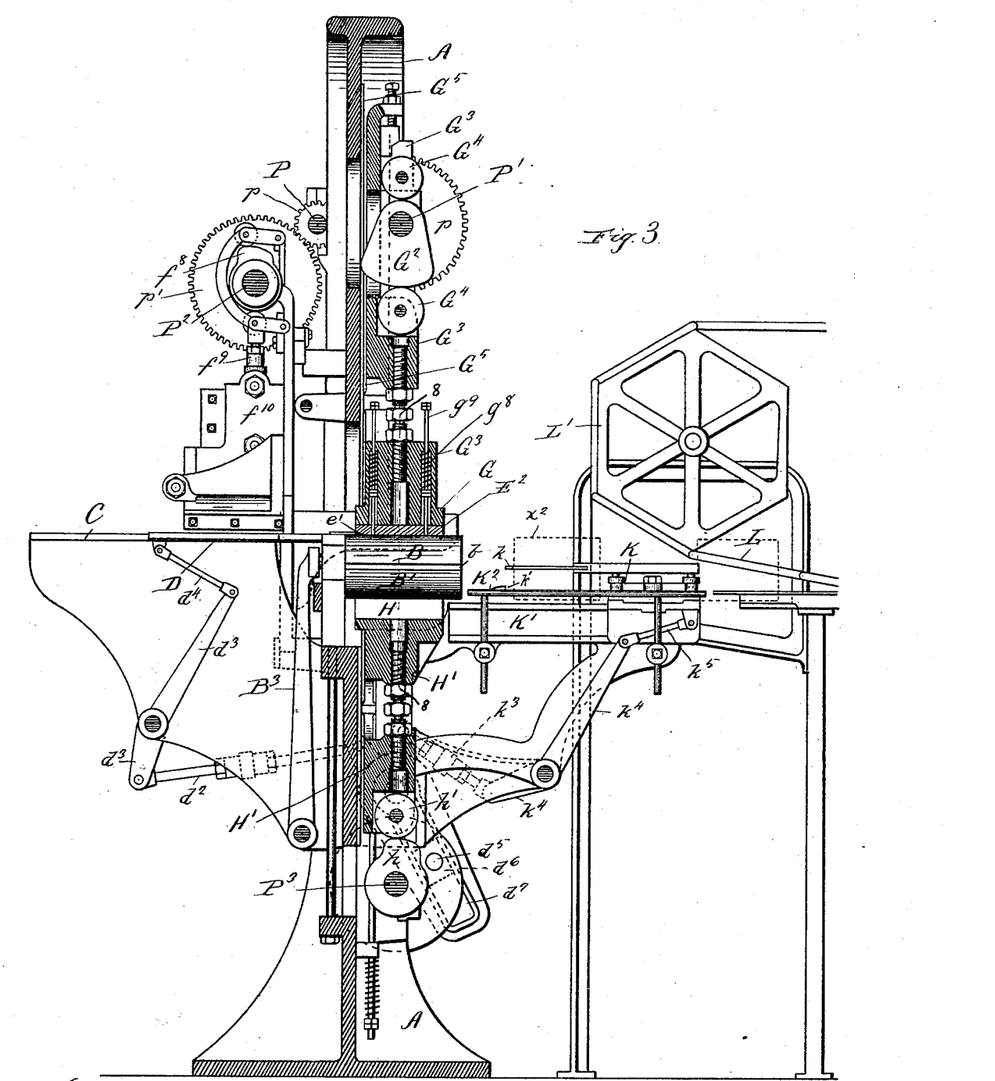
Fig. 3 is a partial vertical longitudinal section on line 3 3 of Fig. 1.
Figures 4, 5:
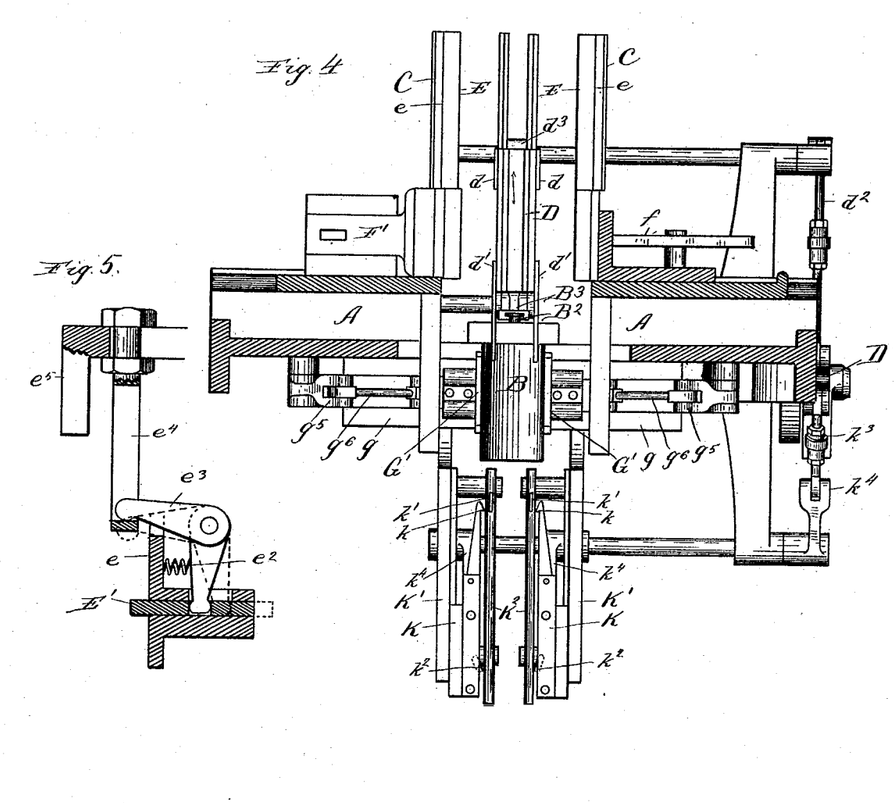
Fig. 4 is a horizontal section on line 4 4 of Fig. 1.
Fig. 5 is a detail vertical sectional view showing the movable guides.
Figures 6, 7:
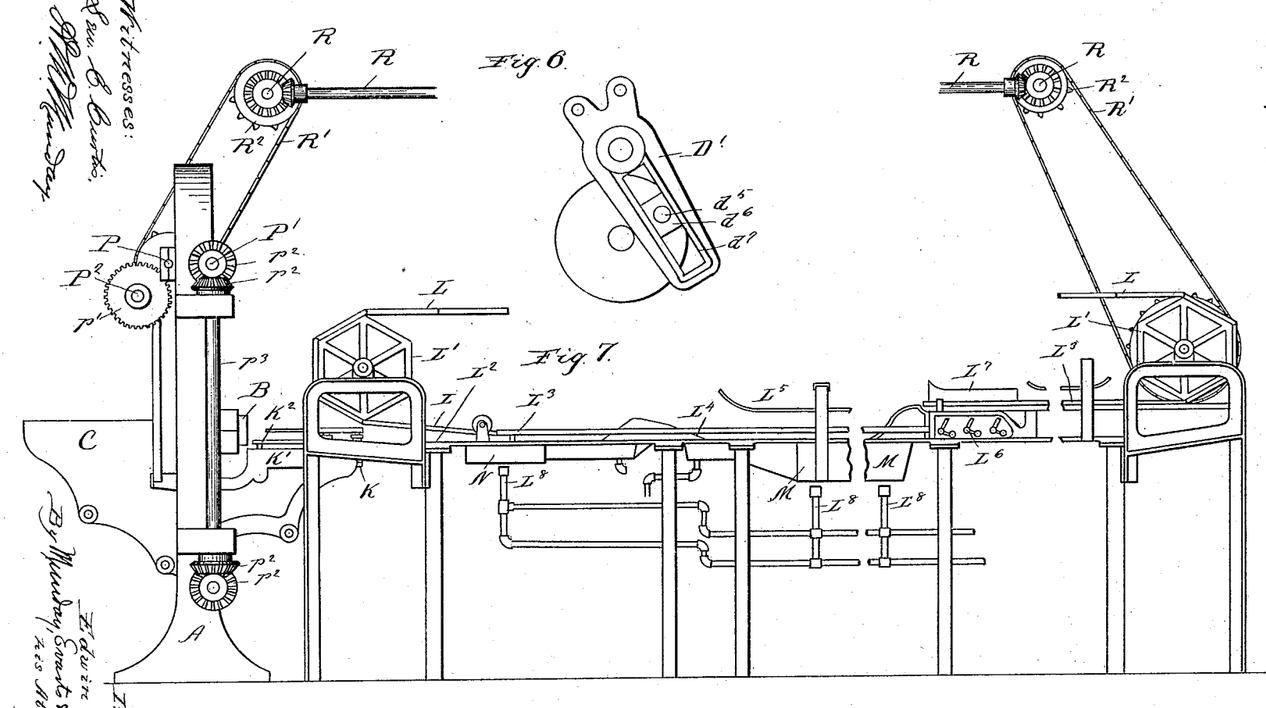
Fig. 6 is an enlarged detail view of parts hereinafter to be described.
Fig. 7 is a side elevation of the machine.

The pulleys L' L' are preferably six-sided. The pulley L', which is adjacent to the can-body-forming devices, is mounted above the can-body tracks $K^2$ $L^2$, about as indicated in Fig. 3, so that the can-body-conveyer device K may carry the can into or under the link of the chain while said link is in an inclined position, and so that the rear end or cross-bar of the link as it advances and descends toward the can-body tracks $K^2$ $L^2$ will catch or strike against the rear end of the can-body, and thus push it along. The reciprocating feed-slide K thus operates to push the can-body within the opening of the link of the chain while the link is in an inclined position.

The feed-slide D operates simultaneously upon two successive sheets, serving to advance one sheet from the edge-folders F F' $F^2$ into position above the horn B while the next succeeding sheet is advanced from the table C to the edge-folders F F' $F^2$. The feed-slide D is provided with inclined projections or pawls $d$ and $d'$. These pawls or projections are adapted to reciprocate under the sheet X, which lies upon the guides E or table C when the feed-slide makes its backward movement, but catch the sheet and push it forward as the feed-slide makes its forward movement. As the slide D makes its backward movement, the sheet is supported and held by the guides. At this time, also, the forward sheet, which is over the horn, is also held and clamped by and between the horn and the movable spring-actuated central guide or clamp, $E^2$, as hereinbefore described.

P is the main driving-shaft of the machine. From this shaft motion is communicated to the counter-shaft P' and the cam-shafts $P^2$ $P^2$ by suitable gears, $p$ $p'$, and to the lower counter-shaft, $P^3$, by beveled gears $p^2$ and vertical connecting-shaft $p^3$. The feed-slide D is reciprocated by a slotted lever, D', connecting-link $d^2$, lever $d^3$, and link $d^4$, the slotted lever D' being operated from the shaft $P^3$ through a crank or wrist pin, $d^5$, which is furnished with a slide, $d^6$, that reciprocates in the slot $d^7$ of the lever D'.

The extractor-slide K, which operates to convey the can-bodies from the horn B to the carrier L, is reciprocated by this same lever, D', through similar connecting mechanism—viz., link $k^3$, lever $k^4$, and link $k^5$.

The vertically-reciprocating edge-folders F F—one on each side—are reciprocated in opposite directions from the cam-shafts $P^2$ $P^2$ by suitable levers, $f$ $f$, connecting-links $f'$ $f'$, and cams $f^2$ $f^2$. The horizontally-reciprocating edge-holders F' F' are moved by levers $f^3$ $f^3$ and cams $f^4$ $f^4$. The lower folder $F^2$ is stationary, and constitutes, in fact, the continuation of the guide E. This lower steel folder-blade $F^2$ is bolted or otherwise rigidly secured to the guide E, as shown in Fig. 9. The upper folder $F^2$ is secured to a vertically-movable lever, $f^5$, pivotally connected by a link, $f^6$, to the frame at $f^7$, so that the folder $F^2$ may be given an up-and-down and also a lateral movement to release or loosen the sheet X from the folders after the hooks $x$ are formed thereon. This folder $F^2$ or its sliding lever $f^5$ is operated by a cam, $f^8$, through the link $f^9$ and slide $f^{10}$. The upper folder $F^2$, being thus movable, serves to clamp the sheet during the folding operation between itself and the guide E. To similarly clamp the sheet near the opposite edge, a clamp, $F^3$, operates in conjunction with the lower stationary folder $F^2$. The clamp $F^3$ is operated by a cam, $f^{11}$, and connecting-link $f^{12}$.

The folder device G, which operates to bend or partially bend the sheet around the horn, is operated by a cam, $G^2$, on the shaft $P'$, the slide $G^3$, upon which the folder G is mounted, being furnished with friction-rollers $G^4$, that impinge against the cam. $G^5$ $G^5$ are the guides in which the slide $G^3$ reciprocates. The horizontally-movable folders $G'$ $G'$ are reciprocated in their guideways $g^2$ by cams $g^3$ on the shaft $P^3$, connecting-links $g^4$, levers $g^5$, and links $g^6$.

The horizontally-movable guide-plates $E'$ are withdrawn by springs $e^2$ during the movement of the folding device G, and these guide-plates are held out in position for supporting the edges of the sheet when the folder G is in its upper position by a bent lever, $e^3$, which is connected to the slide $G^3$ by a slotted pin, $e^4$, secured to a bracket, $e^5$, on said slide $G^3$. When the slide $G^3$ begins to descend to cause the folder G to bend the sheet X down and around the horn B, the springs $e^2$ will at once withdraw the guides $E'$, and thus permit the sheet to be bent downward. The wedge $B^2$, by which the horn B is contracted and expanded, is operated by a lever, $B^3$, from a cam, $B^4$, on the shaft $P^3$.

The seam closing or squeezing device H is reciprocated or operated by a cam, $h$, on the shaft $P^3$. The slide $H'$, to which the seam-closer H is secured, is provided with friction-roller $h'$ to bear against the cam $h$.

The construction of the horn B and of the mechanism for operating its expanding and contracting parts, of the table C, of the feed-slide D and the mechanism for operating it, of the hook or edge folders F $F'$ $F^2$ and the mechanism for operating the same, and of the body forming or bending devices G $G'$ are all well known to those skilled in the art, and are fully shown and described in said Patent No. 250,266, before referred to, and need not, therefore, be here described more in detail.

The movable can-body carrier L is operated from the main driving-shaft $P'$ by suitable connecting shaft and mechanism, R $R'$ $R^2$, communicating with the sprocket wheel or pulley $L'$ at the farther end of the machine. This connecting mechanism is made to drive the farther pulley $L'$, in order that the lower line of the chain L, which carries the can-bodies, may be pulled instead of pushed, as would, to a greater or less extent, be the case if the power were communicated to the pulley $L'$ adjacent to the can-body-forming device.

The construction of the carrier L, the tracks $L^2$ and $L^3$, the wiper device, and the other parts of the soldering portion of the machine are fully shown and described in said Patent No. 250,096, and need not, therefore, be here set forth in detail.

As shown in the drawings, the body-former horn is of the type commonly known in the art as an "expansible" horn, and the hooks or folds $x$ on the edges of the sheet are formed before the sheet is advanced to the horn; but my invention is not confined to expansible body-former horns nor to body-former machines which operate to form the hooks $x$ before the sheet is advanced to the horn. My invention may be used with any well-known kind of body-former horn and with any suitable mechanism known to the art for bending or folding the sheet around the horn, and also with any known construction of mechanism for folding and interlocking the edges of the sheet to form the side seam of the can-body; and, likewise, my invention is not confined to the particular construction of side-seam-soldering device which is shown in the drawings.

I claim—

1. The combination, with a can-body-former horn, of a side-seam-closing device below the horn, adapted and operating to close the side seam against the lowermost part of the horn, a side-seam-soldering device having a can-body carrier, and mechanism for delivering the can-body from said horn into said carrier, substantially as specified.

2. The combination, in a can-body-forming machine, with a body-blank-feed device, of a can-body-former horn below said feed device and above which the blanks are fed, and mechanism for folding the blank downward around said horn, and a device below said horn for closing the folds of the seam against the horn, substantially as specified.

3. The combination, with a can-body-former horn, of mechanism above the horn for folding or forming the can-body downward around the horn, and a seam-closing device for squeezing or closing the folds of the seam against the horn, substantially as specified.

4. The combination, with a can-body-forming machine constructed and adapted to interlock and close the seam at the under side of the can-body, of a side-seam-soldering machine having a bath or soldering device over which the can-body is carried, and means for delivering the can-body from the forming-machine to the side-seam-soldering machine, substantially as specified.

5. The combination, with a can-body-former horn, of a device for feeding the blank sheets in above the horn, a device for folding the sheet downward around the horn, devices for forming the side seam of the can-body, a side-seam-soldering device having a carrier, and a device for moving the can-body from said horn and delivering the same into said carrier, substantially as specified.

6. The combination, with guides for the sheet, of a sheet-feed slide, edge-folders for forming hooks on the edges of the sheet, a body-former horn below said guides and above which the sheets are fed, a vertically-reciprocating folder above the horn for bending the sheet downward around the horn, two longitudinally-reciprocating folders for interlocking the hooks or folds of the seam at the lowermost point of the horn, and a seam-closing device below the horn for closing the folds of the seam against the horn, substantially as set forth.

7. The combination, with guides for the sheet, of a sheet-feed slide, edge-folders for forming hooks on the edges of the sheet, a body-former horn below said guides and above which the sheets are fed, a vertically-reciprocating folder above the horn for bending the sheet downward around the horn, two longitudinally-reciprocating folders for interlocking the hooks or folds of the seam at the lowermost point of the horn, a seam-closing device below the horn for closing the folds of the seam against the horn, a side-seam solderer having a can-body carrier, and an extractor-slide for removing the can-bodies from said horn and delivering them to said carrier, substantially as specified.

8. The combination, with guides for the sheet, of a sheet-feed slide, edge-folders for forming hooks on the edges of the sheet, a body-former horn below said guides and above which the sheets are fed, a vertically-reciprocating folder above the horn for bending the sheet downward around the horn, two longitudinally-reciprocating folders for interlocking the hooks or folds of the seam at the lowermost point of the horn, a seam-closing device below the horn for closing the folds of the seam against the horn, a side-seam solderer having a can-body carrier, and an extractor-slide for removing the can-bodies from said horn and delivering them to said carrier, said side-seam solderer having a fluxing device and a solder bath over or through which the can-bodies are carried by said carrier, substantially as specified.

9. The combination, with a can-body former, of a side-seam solderer having a link or chain can-carrier, pulleys upon which said chain is mounted, means for delivering the can-bodies from said former to said carrier, and driving mechanism connecting the farther pulley of said chain carrier with the driving-shaft of the body-former, substantially as specified.

10. The combination, with a can-body-former horn, of a device below the horn for closing the seam against the horn, substantially as specified.

EDWIN NORTON.

Witnesses:
H. M. MUNDAY,
EDMUND ADCOCK.